United States Patent
Marukawa et al.

[11] Patent Number: 6,120,564
[45] Date of Patent: Sep. 19, 2000

[54] CONNECTION METHOD FOR BATTERIES

[75] Inventors: Shuhei Marukawa, Toyohashi; Fumihiko Yoshii, Fujisawa; Munehisa Ikoma, Toyohashi, all of Japan

[73] Assignee: Matsushita Electric Industrial Co., Ltd., Osaka, Japan

[21] Appl. No.: 09/253,218

[22] Filed: Feb. 19, 1999

Related U.S. Application Data

[62] Division of application No. 08/938,376, Sep. 26, 1997, Pat. No. 5,900,332.

[30] Foreign Application Priority Data

Sep. 26, 1996 [JP] Japan .................................. 8-254246

[51] Int. Cl.⁷ .............................. H01M 6/02; H01M 2/22

[52] U.S. Cl. ......................... 29/623.1; 429/158; 439/500

[58] Field of Search ................................ 429/157, 158, 429/160; 29/623.1; 439/500

[56] References Cited

U.S. PATENT DOCUMENTS 3,923,549 12/1975 Mabuchi et al. .

*Primary Examiner*—John S. Maples
*Attorney, Agent, or Firm*—Ratner & Prestia

[57] ABSTRACT

A connector for connecting a first cell and a second cell of a battery in series. Each one of the first cell and second cell has (a) a metal casing as the negative electrode, and (b) a metal electrode installed at one end of the casing, including a first flat portion as the positive electrode. The connector has a side wall capable of fitting the casing inside, and a second flat portion orthogonal to the side wall. A first projection for welding to the electrode member is installed on the second flat portion. A second projection for welding to the casing is installed on an inside surface of the wall. The first projection of the electrode abuts against the first surface of the first cell and are welded together. The side wall of the connector is coupled to the outside of the casing of the first cell, and the second projection of the connector abuts against the surface of the casing of the second cell, and are welded together.

11 Claims, 5 Drawing Sheets

CONNECTION METHOD FOR BATTERIES

This application is a division of U.S. patent application Ser. No. 08/938,376, filed Sep. 26, 1997 now U.S. Pat. No. 5,900,332.

FIELD OF THE INVENTION

The present invention relates to a battery, and more particularly to a connection structure of a storage battery module for obtaining a specified output voltage by connecting plural cells in series.

BACKGROUND OF THE INVENTION

A connector for connecting cells is used for forming a storage battery module for obtaining a specified output voltage by connecting cells in series. FIG. 4 is a sectional view showing a connection constitution of cells in the prior art. FIG. 5(a) and FIG. 5(b) are a plan view and a side view showing a constitution of a connector in the prior art.

In FIG. 4, a first cell A and a second cell B, respectively, have a metal casing 111 formed cylindrically, and a metal electrode 110 installed at one end, electrically insulated from the metal casing 111. The metal electrode 110 serves also as a positive electrode, and the metal casing 111, as a negative electrode. A bump 114 is set in the center of the metal electrode 110, and a rubber valve 116 is placed in the bump 114 for discharging the gas generated in the cell. By connecting the metal electrode 110 of the first cell A to the metal casing 111 of the second cell B, the first cell A and second cell B are connected in series. This series connection is achieved by welding a connector 115 to the metal electrode 110 and metal casing 111. As shown in FIGS. 5(a) and 5(b), the connector 115 is formed in a circular disk in two-step depth. An opening 117 is formed in the center of the connector 115 to provide clearance for the bump 114 of the metal electrode 110. The outer surface of a flat portion 118 of the connector 115 is welded to the metal electrode 110 of the first cell A, and the inner surface of a tubular portion 119 is welded to the metal casing 111 of the second cell B. In this way, plural cells are connected in series, and coupled mechanically, so that a battery module of specified output voltage is composed.

In this conventional constitution, welding of the connector 115 and metal electrode 110 is done by spot welding by feeding welding current between the flat portion 118 of the connector 115 and the metal electrode 110. In this case, one welding electrode is fitted to the flat portion 118, and another welding electrode is fitted to the bump 114 of the metal electrode 110. In ordinary spot welding, welding current is passed by pressing two weld zones between the welding electrodes, and the pressed portions are fused and welded.

In the connection battery of the prior art, however, since there is no pressing part, most current flows between the welding electrodes as the surface current of the connector 115 and metal electrode 110. Accordingly, when the connector 115 is made of a thick material or has a small specific resistance, welding is difficult. This state causes a similar problem when the tubular portion 119 is welded to the metal casing 111. That is, in the conventional constitution, when the connector 115 is made of a thick material or has a small specific resistance, the electric resistance of the electric connection between cells becomes large, resulting in increased loss due to large current flow. Moreover, the mechanical strength of the connector 115 is weak and has a low welding strength. Therefore, the strength of the mechanical coupling between the cells is also low.

Furthermore, since a welding current flows in the recess 114, the rubber valve 116 placed inside of the bump 114 may deteriorate due to heat generation.

SUMMARY OF THE INVENTION

A connection structure of a battery of the exemplary embodiment of the present invention has a constitution of connecting a first cell and a second cell in series by using a connection member. Each one of the first cell and the second cell has:

(a) a metal outer member in a container shape containing plural function element members inside, serving as an electrode having one pole, and (b) a metal electrode member installed at one end, being electrically insulated from the outer member, including a first flat portion serving as an electrode having another pole.

The connector has a side wall capable of receiving the outer member, and a second flat portion orthogonal to the side wall. A first projection for welding to the electrode member is installed on the second flat portion, a second projection for welding to the outer member is installed on an inside surface of the wall. The second flat portion of the connector is opposite to the first flat portion of the first cell. The first projection of the electrode member abuts against the first flat portion of the first cell and is welded and joined. The side wall of the connector is fitted to the outside of the outer member of the second cell, and the second projection of the connector abuts against the surface of the outer member of the second cell, and is welded and joined.

Preferably, the outer member has a cylindrical shape, the connector has a cylindrical portion that can be fitted to the outside of the outer member of the cylindrical shape, and the side surface is a side wall of the cylindrical portion.

Preferably, the first projection installed on the connector is composed of a plurality of first projections, and each one of the plurality of first projections is installed in a circular pattern on the second flat portion.

Preferably, the second projection installed on the connector is composed of a plurality of second projections, and each one of the plurality of second projections is installed in a circular pattern centered on the center of the connection member.

The invention also relates to a connection method of a battery by connecting a plurality of cells in series by using a plurality of connection members. Each one of the plurality of cells has:

(a) a metal outer member in a container shape containing a plurality of function element members inside, serving as an electrode having one pole, and (b) a metal electrode member installed at one end, being electrically insulated from the outer member, including a first flat portion serving as an electrode having an other pole.

Each one of the plurality of connection members has a side wall capable of receiving the outer member inside, and a second flat portion orthogonal to the side wall. A first projection for welding to the electrode member is installed on the second flat portion. A second projection for welding to the outer member is installed on an inside surface of the wall. The method comprising:

(1) a step of installing the second flat portion of each connector opposite to the first flat portion of a respective one of the plurality of cells, so that the first projection of the electrode member abuts against the first flat portion of the respective one cell, (2) a step of welding a first contact portion of the first projection and the first flat portion, by applying a current between the connector and the first flat portion of the respective one cell, (3) a step of fitting the inside of the side wall of the connector to the outside of the outer member of a further respective one of the plurality of cells, so that the second projection of the connector abuts against the surface of the outer member of the further respective cell, and (4) a step of welding a second contact portion of the second projection and the outer member, by applying a current between the connector and the outer member of the further respective cell.

In this constitution, since the flat portion of the connector is welded to the metal electrode of the first cell, and the outer wall of the connector is welded to the casing of the second cell, any material can be used for the connector, regardless of the plate thickness or specific gravity, and the welding strength can be increased. Moreover, since the welding positions of the metal electrode and metal casing are located on plural radii, the current path of the connection is the shortest distance. Therefore, a connection structure of cells having an electric connection with low connection resistance and a coupling having high mechanical strength is realized.

DETAILED DESCRIPTION

Figure 1:
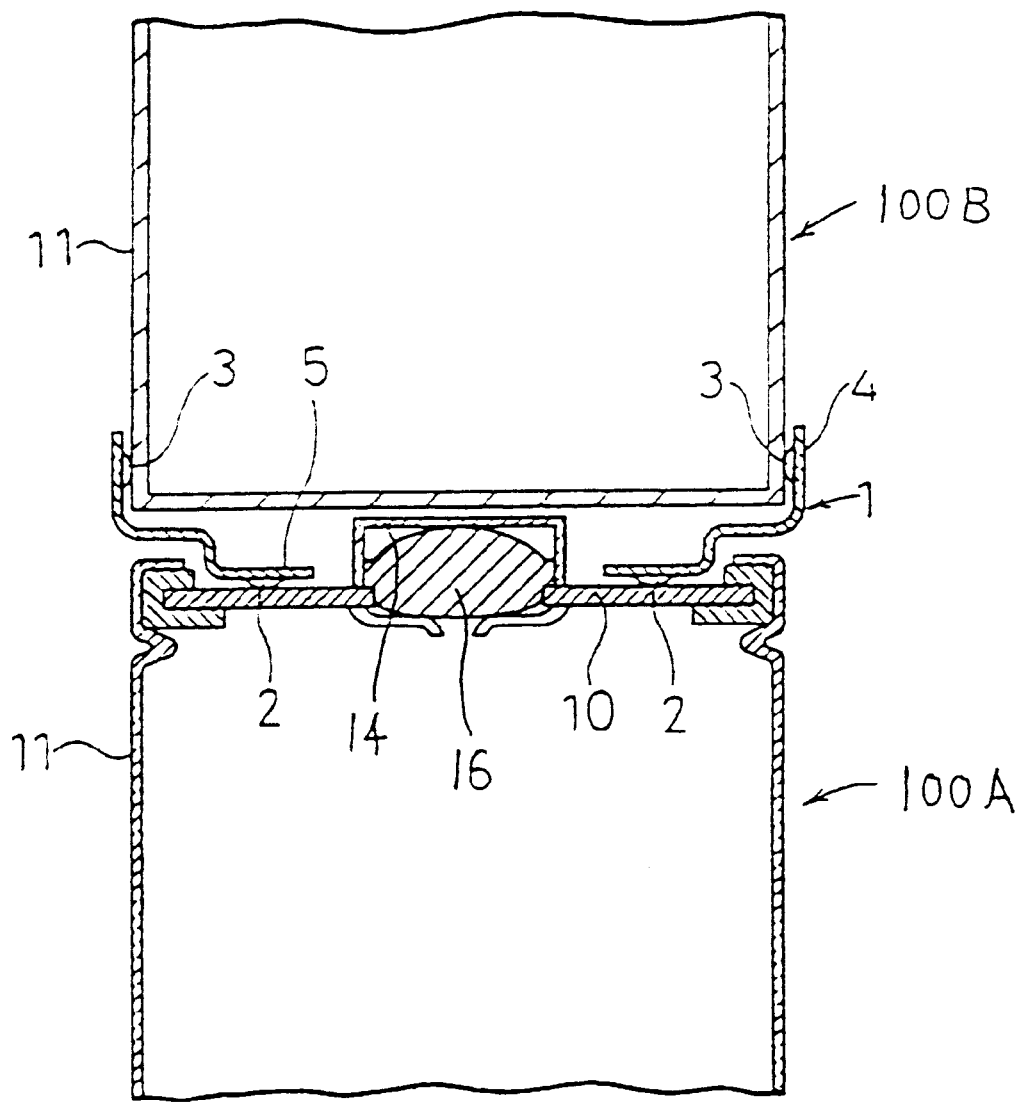
FIG. 1 is a sectional view showing a constitution of a connection structure of a battery according to an exemplary embodiment of the invention.

The entire disclosure of U.S. Pat. No. 5,900,332 is expressly incorporated by reference herein.

Referring now to the drawings, a connection structure of a battery in an exemplary embodiment of the invention is described below. The following embodiment is only an example of carrying out the invention, and is not intended to limit the technical scope of the invention.

A sectional view showing a connection constitution of a battery in an exemplary embodiment of the invention is shown in FIG. 1. Plan view, side view, and perspective view of the connector used in the connection structure of the battery shown in FIG. 1 are shown in FIG. 2 (a), FIG. (b), and FIG. 2 (c), respectively.

In FIG. 1, a first cell 100A and a second cell 100B are a circular cylinder of the same type and size. Each one of the cells 100A and 100B has a cylindrical metal casing 11, and a metal electrode 10 installed at one end and electrically insulated from the metal casing 11. The metal electrode 10 also serves as the positive electrode, and the metal casing 11 serves as the negative electrode. A bump 14 is formed in the center of the metal electrode 10, and a rubber valve 16 for discharging the gas generated in the cells is installed inside of the bump 14. The metal electrode 10 of the first cell 100A and the metal casing 11 of the second cell 100B are connected by using a connector 1. Thus, the first cell 100A and second cell 100B are connected in series.

Figure 2A:
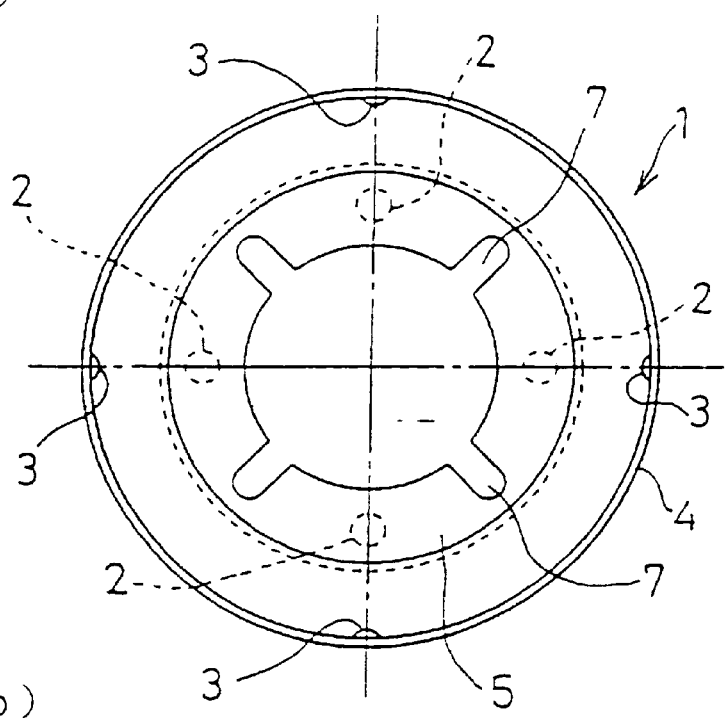
FIG. 2 (a), FIG. 2 (b), and FIG. 2 (c) are plan view, side view, and perspective view, respectively, showing the constitution of the connector used in the connection structure of a battery according to an exemplary embodiment of the invention.
Figure 2B:
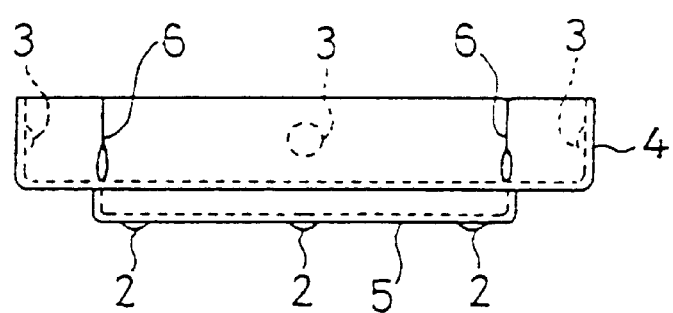
Figure 2C:
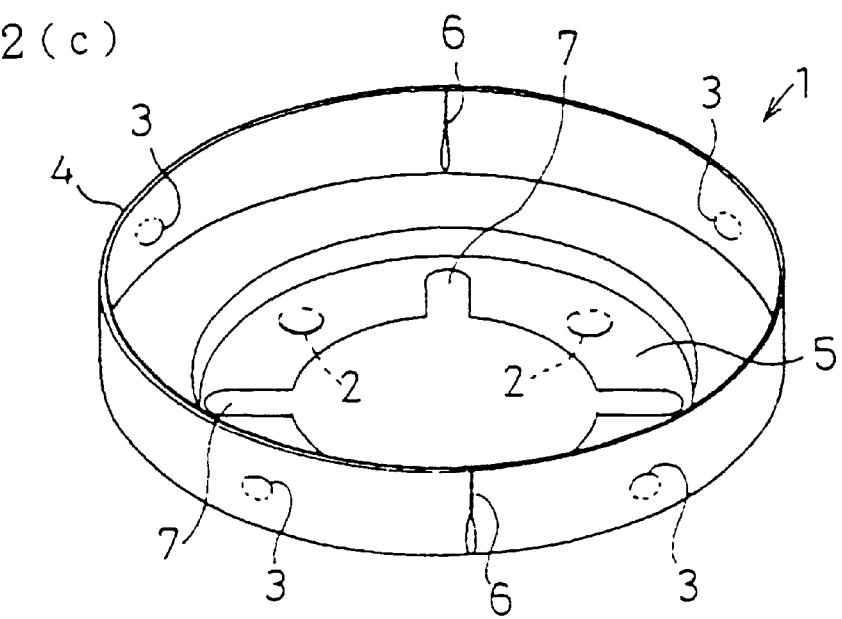

In FIG. 2 (a), FIG. 2 (b) and FIG. 2 (c), the connector 1 has a cylindrical portion 4, and a flat portion 5 at one end of the cylindrical portion 4. That is, the connector 1 has a side wall 4, and a flat portion 5 orthogonal to the side wall. Plural second projections 3 are installed on the inner circumference of the cylindrical portion 4. Each one of the plural second projections 3 is at the same radial distance from the center of connector 1 and projects toward the center of the cylindrical portion 4. Plural first projections 2 are on the outer surface of the flat portion 5. Each one of the plural first projections 2 is at the same radial distance from the center of connector 1.

The connector 1 is formed of conductive and weldable metal. At the inside of the cylindrical portion 4 of the connector 1, the second cell 100B is installed. The plural second projections 3 formed on the cylindrical portion 4 abut against the outer surface of the metal casing 11 of the second cell 100B, and the second projections 3 and metal casing 11 compose a second contact portion. At the outer side of the flat portion 5 of the connector 1, the first cell 100A is installed. The plural first projections 2 formed on the flat portion 5 abut against the outer surface of the metal electrode 10 of the first cell 100A, and the first projections 2 and metal electrode 10 compose a first contact portion. A plurality of slits 6 is formed in the cylindrical portion 4. A plurality of notches 7 is formed in the flat portion 5. Notches 7 have a function of decreasing the reactive current when welding the connector 1 and metal electrode 10. By these notches 7, the heat generation efficiency of the first contact portion is enhanced, so that welding may be done efficiently. Slits 6 formed in the connector 1 function to give an elastic force for pressing the cylindrical portion 4 of the connector 1 in the direction of the metal casing 11 when the cylindrical portion 4 is fitted to the metal casing 11. By the elastic force of the connector 1, the contact force between the plural second projections 3 formed in the connector 1 and the metal casing 11 of the second cell 100B is increased. As a result, the heat generation efficiency of the second contact portion is enhanced, so that welding may be done efficiently. Thus, the connection structure of first cell 100A and second cell 100B is composed.

A connection method of the first cell 100A and second cell 100B is described below. First, the outer surface of the flat portion 5 of the connector 1 is welded to the metal electrode 10 of the first cell 100A. That is, the flat portion 5 is put on the metal electrode 10, and while pressing the flat portion 5 to the metal electrode 10 side, a welding current is applied between the connector 1 and metal electrode 10. At four positions of the plural first projections 2, the connector 1 is welded to the metal electrode 10. That is, the plural first projections 2 formed on the flat portion 5 and the metal electrode 10 contact each other. In this state of contact, when a current is applied between the connector 1 and metal electrode 10, heat is generated in the contact portion of the plural first projections 2 and metal electrode 10, and by this heat generation, each one of the plural first projections 2 and metal electrode 10 are welded at the same time.

In succession, the inside of the cylindrical portion 4 of the connector 1 welded to the metal electrode 10 of the first cell 100A is fitted to the metal casing 11 of the second cell 100B. At this time, the metal casing 11 and plural second projections 3 are in contact with one another. In this state of contact, when a welding current is applied between the metal casing 11 and the connector 1, the connector 1 and metal casing 11 are welded at the same time at four positions of the plural second projections 3.

Figure 3:
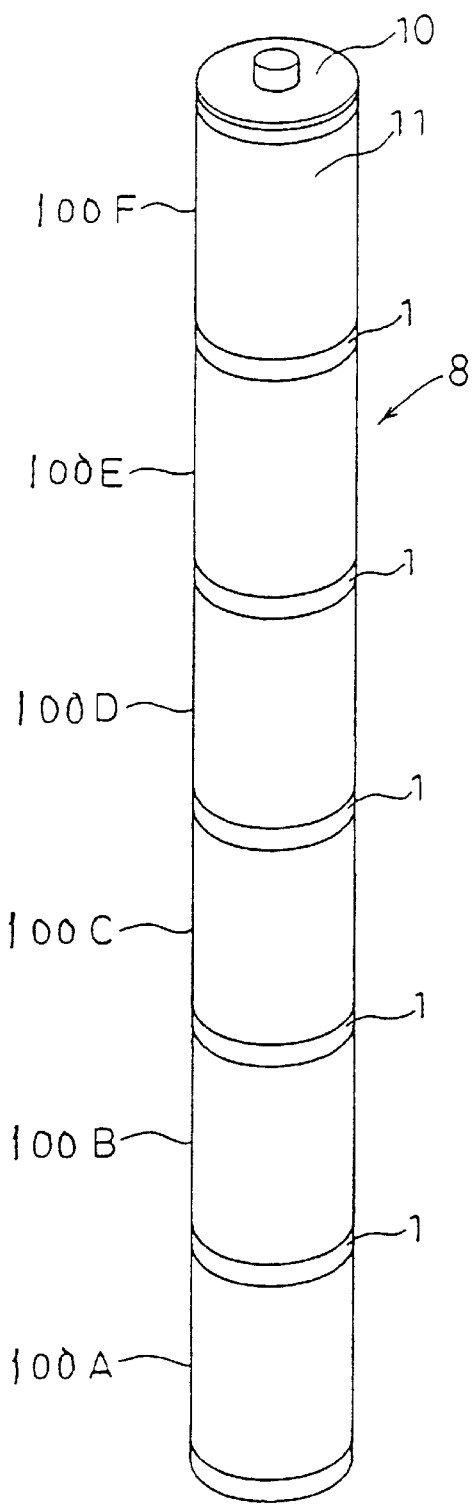
FIG. 3 is a perspective view showing a state of composing a storage battery module by coupling and connecting a plurality of cells in a connection structure of a battery according to a further exemplary embodiment of the invention.
Figure 4:
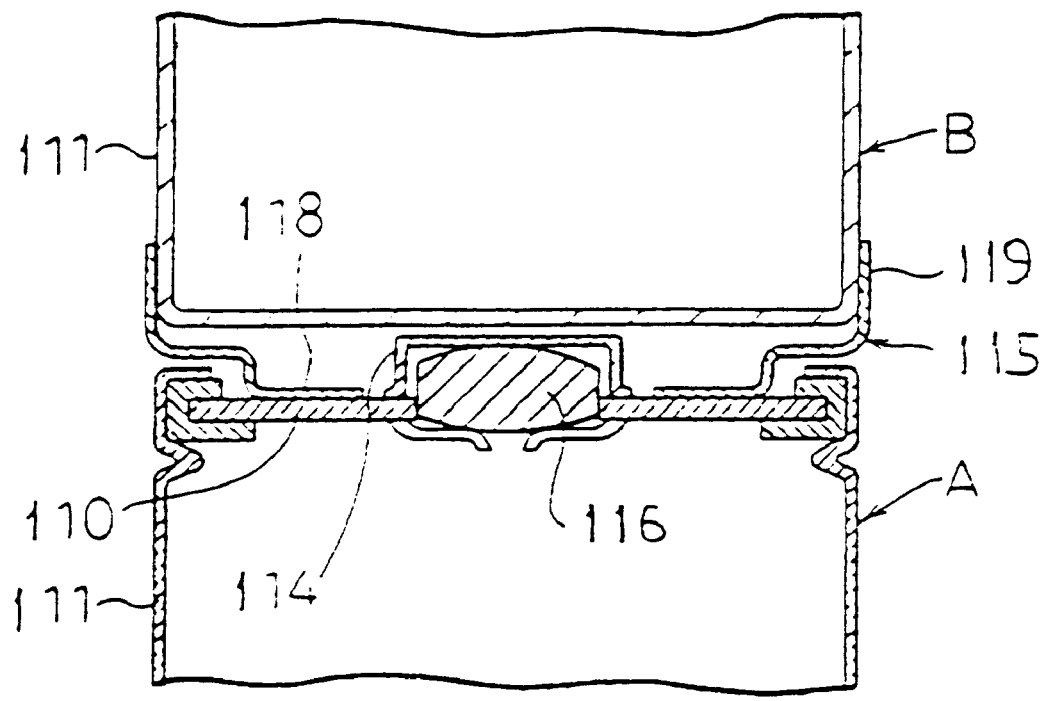
FIG. 4 is a sectional view showing a constitution of a connection structure of a conventional battery.
Figure 5A:
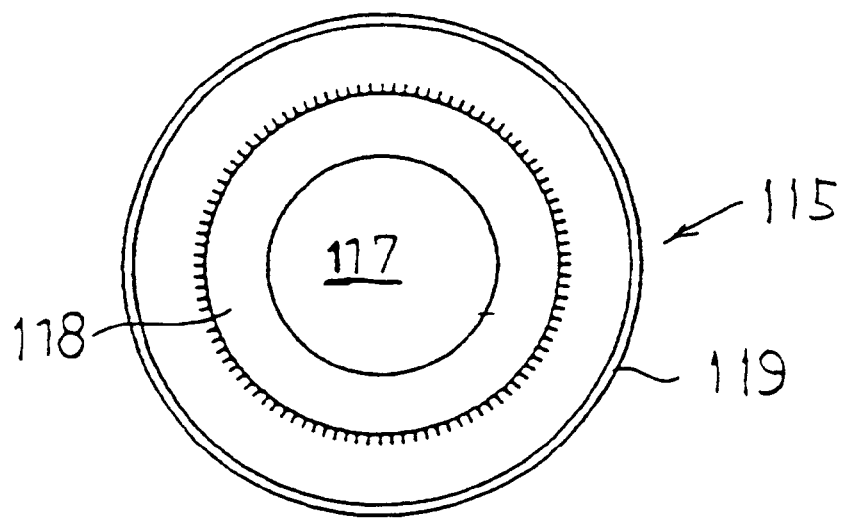
FIG. 5 (a) and FIG. 5 (b) are a plan view and side view, respectively, showing a constitution of the connector used in the connection structure of a conventional battery.
Figure 5B:
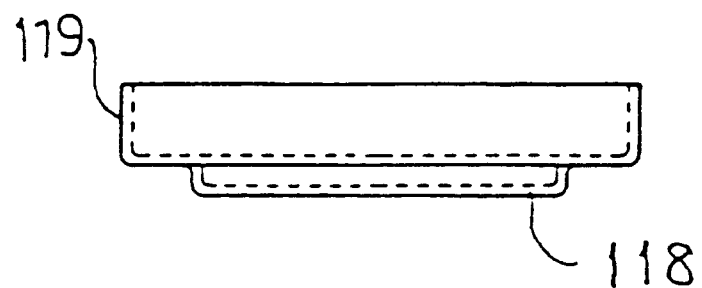

In this way, the first cell 100A and second cell 100B are connected in series by the connector 1. By repeating this connection of cells, for example, a storage battery module 8 having a series connection of third cell 100C, fourth cell 100D, fifth cell 100E, and sixth cell 100F as shown in FIG. 3 results.

Since the plural first projections 2 and plural second projections 3 formed on the connector 1 are formed on the same respective radii, the current path is the shortest distance when the first cell 100A and second cell 100B are connected. Accordingly, the electric power loss due to the specific resistance of the material for composing the connector 1 may be minimized. This electric power loss can also be lowered by increasing the plate thickness of the connector 1. For example, according to the measurement, the resistance in the contact portion of the first projections 2 and metal electrode 10, or the contact portion of the second projections 3 and metal casing 11 was R=0.0681 mΩ at the plate thickness of t=0.18 mm, R=0.0409 mΩ at t=0.30, and R=0.0306 mΩ at t=0.40 mm. Thus, by increasing the plate thickness of the connector 1, it is possible to lower the specific resistance R of the contact portion, and therefore the storage battery module 8 having a small electric power loss is obtained. Furthermore, since the connector having a sufficient thickness can be used, the mechanical strength of the weld zone and coupling strength of the cells are enhanced.

As described herein, the constitution of the invention brings about the following effects.

(1) Since the connector having a sufficient thickness can be used, a battery module having a small electric power loss is obtained.

(2) Since the connection current path is short, the connection resistance is small, and hence a battery module having a small electric power loss can be obtained. In addition, the effect of the specific resistance of the connector on the electric power loss is decreased.

(3) Since the connector having a sufficient thickness can be used, the mechanical strength between connected cells is enhanced, so that a battery module resistant to external forces can be obtained.

What is claimed:

1. A method for connecting in series a bottom portion of a first cell of a battery with a top portion of a second cell of said battery, said bottom portion of said first cell including a metal outer casing serving as a first electrode, said top portion of said second cell including a metal electrode located at one end of said second cell, including a flat portion serving as a second electrode, wherein said method comprises the steps of:

(1) locating a flat portion of a connector opposite to said flat portion of said second cell, so that a first projection of said connector abuts against said flat portion of said second cell, (2) welding a contact portion of said first projection to said flat portion of said second cell, by applying a current between said connector and said flat portion of said second cell, (3) coupling an inside portion of a side wall of said connector to an outside portion of said casing of said first cell, so that a second projection of said connector abuts against a surface of said casing of said first cell, and (4) welding a contact portion of said second projection to said casing, by applying a current between said connector and said casing of said first cell.

2. The method of claim 1, wherein said casing has a cylindrical shape, said connector has a cylindrical portion that can be coupled to the outside of said casing, and said side wall is a side wall of said cylindrical portion.

3. The method of claim 1, wherein said first projection is composed of a plurality of first projections, each one of said plurality of first projections located in a circular pattern on said flat portion of said connector, and when said current is applied between said connector and said flat portion of said second cell, said contact portion of each of said plurality of first projections and said flat portion of said second cell are welded simultaneously.

4. The method of claim 1, wherein said second projection is composed of a plurality of second projections, each one of said plurality of second projections located in a circular pattern centered on a center of said connector, and when said current is applied between said connector and said casing of said first cell, each one of said second contact portions of each one of said plurality of second projections and said casing are welded simultaneously.

5. The method of claim 1, wherein said connector has a notch formed in said flat portion of said connector, and when said current is applied between said connector and said flat portion of said second call, a heat generation efficiency of said contact portion of said first projection is increased.

6. The method of claim 1, wherein said connector has a slit formed in said side wall such that a contact force between said side wall of said connector and said casing of said first cell is increased, and when said current is applied between said connector and said casing a heat generation efficiency of said contact portion of said second projection is increased.

7. A method for connecting a plurality of cells of a battery in series using a plurality of connectors, each one of said plurality of cells having:

a bottom portion including a metal casing serving as a first electrode, and a top portion including a metal electrode located at one end of said cell, said metal electrode having a flat portion serving as a second electrode, wherein said method comprises the steps of:

(1) locating a flat portion of each of said plurality of connectors opposite a flat portion of a respective one of said plurality of cells, so that a first projection of one of said connectors abuts against one of said flat portions of said plurality of cells, (2) welding a first contact portion of said first projection to said flat portion of one of said cells, by applying a first current between said connector and said flat portion of said respective cell, (3) coupling an inside portion of a side wall of each of said connectors to an outside portion of said casing of an adjacent respective one of said plurality of cells, so that a second projection of said connector abuts against a surface of said casing of said adjacent respective one of said plurality of cells, and (4) welding a second contact portion of said second projection and said casing, by applying a second current between said connector and said casing of said adjacent respective one of said plurality of cells.

8. The method of claim 7, wherein said casing has a cylindrical shape, each of said plurality of connectors has a cylindrical portion that can be coupled to the outside of said respective casing, and said side wall is a side wall of said cylindrical portion.

9. The method of claim 7, wherein said first projection is composed of a plurality of first projections, each one of said plurality of first projections located in a circular pattern on said flat portion of said connector, and when said first current is applied between said connectors and said flat portion of said respective one of said plurality of cells, said first contact portion of each of said plurality of first projections and said flat portion of said cell are welded simultaneously, said second projection located on each of said plurality of connector is composed of a plurality of second projections, each one of said plurality of second projections located in a circular pattern centered on a center of each one of said plurality of connectors, and when said second current is applied between each of said plurality of connectors and said respective casing of each of said plurality of cells, said second contact portion and said casing are welded simultaneously.

10. A method for connecting in series a plurality of cells of a battery comprising the steps of:

providing a first cell having:
(a) a first metal member at the top of said first cell and serving as a first electrode of said first cell, and
(b) a first outer metal casing insulated from said first metal member extending to the bottom of said first cell and serving as a second electrode of said first cell;

providing a second cell having:
(a) a second metal member at the top of said second cell and serving as a first electrode of said second cell, and
(b) a second outer metal casing insulated from said second metal member extending to the bottom of said second cell and serving as a second electrode of said second cell;

providing a connector having:
(a) a flat portion having a least one projection extending axially of said connector from said flat portion, and
(b) a side wall portion extending around the periphery of said flat portion and having at least one projection extending inward from said side wall;

positioning said connector between said first cell and said second cell with:
(a) said projection extending axially of said connector from said flat portion of said connector in contact with said second metal member of said second cell, and
(b) said projection extending inward from said side wall portion of said connector in contact with said first outer metal casing of said first cell; and welding:
(a) said projection extending axially of said connector from said flat portion of said connector to said second metal member of said second cell by applying a current between said connector and said second metal member of said second cell, and
(b) said projection extending inward from said side wall portion of said connector to said first outer metal casing of said first cell by applying a current between said connector and said first outer metal casing of said first cell.

11. A method for connecting in series a plurality of cells of a battery according to claim 10 wherein:
(a) said first outer metal casing and said second outer metal casing are circular,
(b) said side wall of said connector is circular,
(c) said connector has:
(1) a plurality of projections extending axially of said connector from said flat portion and spaced from the center of said connector at the same radius and which are welded simultaneously to said second metal member of said second cell, and
(3) a plurality of projections extending inward from said side wall and which are welded simultaneously to said first outer metal casing of said first cell.

* * * * *